US012657558B2

(12) United States Patent
Kim

(10) Patent No.: US 12,657,558 B2
(45) Date of Patent: Jun. 16, 2026

(54) METHOD AND SYSTEM FOR EVALUATING CONTRIBUTIONS TO CREATION OF ELEMENT OF PROTOTYPE

(71) Applicant: STUDIO XID KOREA, INC., Seoul (KR)

(72) Inventor: Soo Kim, Jeollabuk-do (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

(21) Appl. No.: 18/936,024

(22) Filed: Nov. 4, 2024

(65) Prior Publication Data

US 2025/0061434 A1     Feb. 20, 2025

Related U.S. Application Data

(62) Division of application No. 18/342,532, filed on Jun. 27, 2023, now Pat. No. 12,165,114.

(30) Foreign Application Priority Data

May 4, 2023     (KR) ........................ 10-2023-0058737

(51) Int. Cl.
*G06Q 20/10*          (2012.01)
*G06Q 10/10*          (2023.01)
*G06Q 30/0201*          (2023.01)

(52) U.S. Cl.
CPC ............. *G06Q 20/10* (2013.01); *G06Q 10/10* (2013.01); *G06Q 30/0201* (2013.01); *G06Q 2220/12* (2013.01)

(58) Field of Classification Search
None
See application file for complete search history.

(56) References Cited

U.S. PATENT DOCUMENTS

2003/0192029 A1* 10/2003 Hughes .......... G06Q 10/063112
                                                            717/102
2015/0089353 A1*  3/2015 Folkening ............... H04L 67/10
                                                            715/234
2015/0235282 A1*  8/2015 Kamath .................... G06F 8/20
                                                            717/102

(Continued)

FOREIGN PATENT DOCUMENTS

KR          101228969 B1     2/2013
KR          101594946 B1     2/2016

(Continued)

*Primary Examiner* — Jamie R Kucab
(74) *Attorney, Agent, or Firm* — Studebaker Brackett PLLC

(57)          ABSTRACT

Provided is a method performed by a least one computing device for evaluating contributions to the creation of an element of a prototype. The method comprises determining a second consumption performance of second prototype content, which is obtained by editing first prototype content including a plurality of first interactions and includes a plurality of second interactions, comparing the first interactions and the second interactions and calculating a ratio between contributions of a first creator of the first prototype content and a second creator of the second prototype content to the second consumption performance based on a result of the comparison of the first interactions and the second interactions.

9 Claims, 12 Drawing Sheets

(56)        References Cited

U.S. PATENT DOCUMENTS

2021/0182767 A1*  6/2021  Tibrewala ...... G06Q 10/063114
2021/0224717 A1*  7/2021  Hicks ............. G06Q 10/063112
2023/0046771 A1*  2/2023  Kannan ................ G06Q 10/103
2023/0252592 A1*  8/2023  Cella ................... G06Q 10/067
                                                    705/35

FOREIGN PATENT DOCUMENTS

KR          101653797  B1    9/2016
KR    10-2016-0148296  A    12/2016
KR    10-2017-0024881  A     3/2017
KR          101926623  B1   12/2018
KR    10-2020-0012543  A     2/2020
KR          102174012  B1   11/2020
KR          102299405  B1    9/2021
KR    10-2022-0018711  A     2/2022
KR          102497475  B1    2/2023

* cited by examiner

FIG. 4

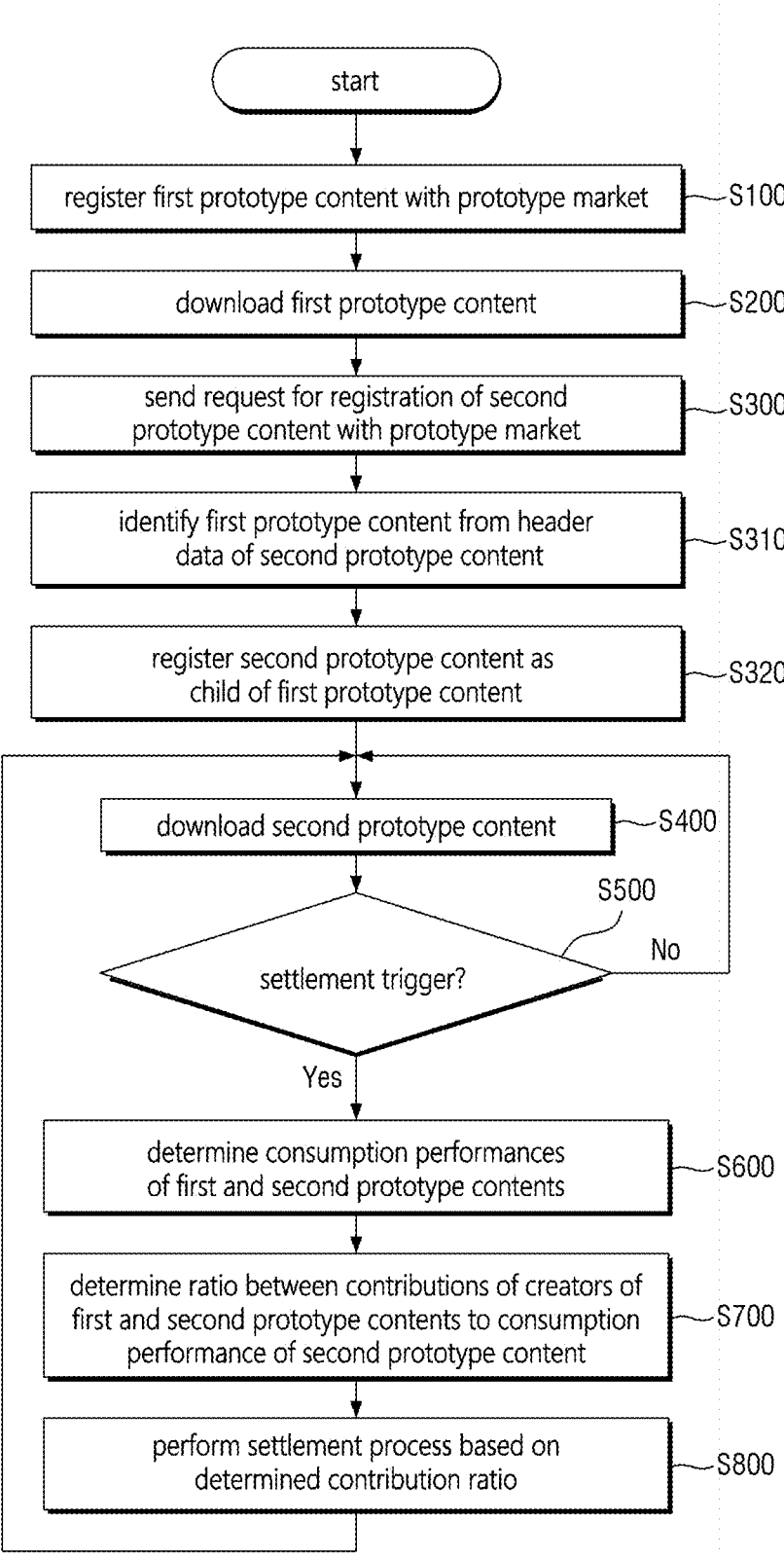

start register first prototype content with prototype market — S100 download first prototype content — S200 send request for registration of second prototype content with prototype market — S300 identify first prototype content from header data of second prototype content — S310 register second prototype content as child of first prototype content — S320 download second prototype content — S400 settlement trigger? — S500    No

Yes determine consumption performances of first and second prototype contents — S600 determine ratio between contributions of creators of first and second prototype contents to consumption performance of second prototype content — S700 perform settlement process based on determined contribution ratio — S800

20

| | Interaction ID | NEW | Number of times edited | number of reproductions | maximum number of reproductions per unit tim |
|---|---|---|---|---|---|
| | 21 | 22 | 23 | 24 | 25 |
| 20a | 0x02346AC030EDA | True | 2 | 10 | 0 |
| 20b | 0x0245643630EDA | False | 10 | 100 | 2 |
| 20c | 0x0245622630354 | True | 0 | 1200 | 3 |
| 20d | 0x0236AC030EA3D | True | 58 | 2290 | 25 |
| ... | ... | ... | ... | ... | ... |
| 20n | 0x02346AC2344DA | False | 0 | 500 | 6 |

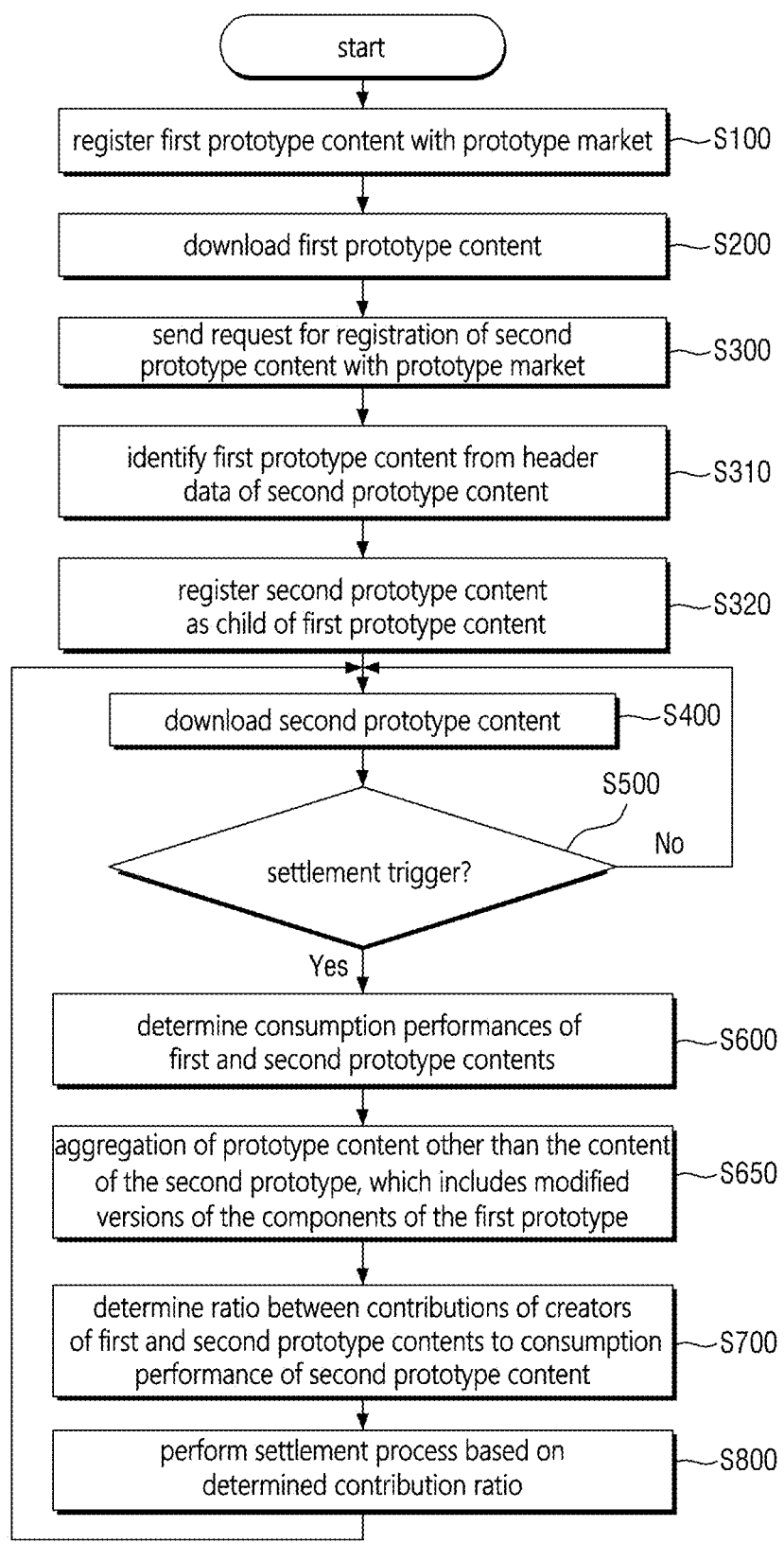

start register first prototype content with prototype market ——S100 download first prototype content ——S200 send request for registration of second prototype content with prototype market ——S300 identify first prototype content from header data of second prototype content ——S310 register second prototype content as child of first prototype content ——S320 download second prototype content ——S400

S500 settlement trigger?    No

Yes determine consumption performances of first and second prototype contents ——S600 aggregation of prototype content other than the content of the second prototype, which includes modified versions of the components of the first prototype ——S650 determine ratio between contributions of creators of first and second prototype contents to consumption performance of second prototype content ——S700 perform settlement process based on determined contribution ratio ——S800

1

METHOD AND SYSTEM FOR EVALUATING CONTRIBUTIONS TO CREATION OF ELEMENT OF PROTOTYPE

CROSS-REFERENCE TO RELATED APPLICATION

This application is a Divisional of U.S. application Ser. No. 18/342,532 filed on Jun. 27, 2023, which claims priority from Korean Patent Application No. 10-2023-0058737 filed on May 4, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a method and system for evaluating contributions to the creation of an element of a prototype, and more particularly, to a method of evaluating the contributions of creators to the consumption performance of user interface (UI) prototype content, which is obtained by editing existing prototype content, and a system having the method applied thereto.

2. Description of the Related Art

Terminal manufacturers, application manufacturers, and online service providers are putting massive effort into designing graphical user interfaces (UIs) to increase user convenience, and various tools for producing prototypes of GUIs are being used in the process of designing GUIs. Before applying GUIs to terminals, applications, or online services (collectively, "applications"), GUI producers can identify not only various aspects of the GUIs in terms of user convenience, user interaction, etc., but also the effects (e.g., visual effects) of the GUIs. Also, the GUI producers can share the prototypes of the GUIs and exchange opinions with third parties such as application developers. GUIs can be provided to the application developers as prototypes and can be programmed and implemented later on applications by the application developers.

Generally, a GUI consists not only of visual objects that can be displayed, but also various interactions between a user and the visual objects. As devices equipped with touch screens are widespread, various types of interactions have been provided to enhance user convenience. For example, the applicant of the present disclosure has suggested, in International Application No. PCT/KR2015/001870, filed on Feb. 6, 2015 (entitled "Method and System for Providing Prototyping Tool, and Non-Transitory Computer-Readable Recording Medium"), that prototyping content can be created as a set of interactions consisting of triggers, objects, and responses, and has provided "ProtoPie," which is a UI prototyping tool based on the technical concept disclosed in the international application.

Here, the term "interaction" encompasses a variety of interactions that may occur between a user and a device, and an interaction may consist of a response, which is an operation performed by a device, a trigger, which functions as a triggering event that causes a predetermined action, and an object, which is the target of the response or the trigger.

Meanwhile, prototype content, which consists of interactions and can function as UI mockup content, can be shared online and can thus result in the creation of a better UI. For example, a first creator may register first prototype content, which is the first creator's creation, with a prototype market in return for a monetary reward, and a second creator may purchase and download the first prototype content, may obtain second prototype content by editing the first prototype content, and may register the second prototype content with the prototype market. In this example, the second prototype content may be considered as being a cocreation of the first and second creators, but there has yet been suggested no satisfactory method of distributing the profits from the sales of the second prototype content between the first and second creators.

For this and other reasons, there is a clear limit in sharing UI prototype content online, which can be a serious impediment to the innovation of UIs.

SUMMARY

Aspects of the present disclosure provide a method and system for evaluating the ratio between the contributions of a first creator of first prototype content and a second creator of second prototype content, which is obtained by editing the first prototype content, to the creation of the second prototype content in accordance with a predetermined criterion.

Aspects of the present disclosure also provide a method and system for supporting the editing of the elements of original prototype content by providing a communication channel between the creator of the original protype content and creators who produce edited versions of the prototype content later.

Aspects of the present disclosure also provide a method and system for automatically distributing the profits from the blockchain-based sales of a prototype by evaluating the contribution of each creator to the creation of the prototype.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for evaluating contributions to the creation of an element of a prototype may comprise determining a second consumption performance of second prototype content, which may be obtained by editing first prototype content including a plurality of first interactions and may includes a plurality of second interactions, comparing the first interactions and the second interactions and calculating a ratio between contributions of a first creator of the first prototype content and a second creator of the second protype content to the second consumption performance based on a result of the comparison of the first interactions and the second interactions.

In some embodiments, wherein the determining the second consumption performance, may comprises acquiring a number of downloads of the second prototype content, acquiring a number of children prototype contents that may be obtained by editing the second prototype content and are registered with the computing system, and determining the second consumption performance based on the number of downloads of the second prototype content and the number of registered child prototype contents of the second prototype content.

In some embodiments, determining a first consumption performance of the first prototype content, wherein the comparing the first interactions and the second interactions, may comprises comparing a number of first interactions and a number of second interactions, and the calculating the ratio between the contributions of the first and second creators, may comprises comparing the first and second consumption performances and calculating the ratio between the contributions of the first and second creators based on a result of the comparison of the numbers of first and second interactions if the result of the comparison of the numbers of first and second interactions corresponds to the result of the comparison of the first and second consumption performances.

In some embodiments, determining a first consumption performance of the first prototype content, wherein the comparing the first interactions and the second interactions, may comprises comparing a total amount of information of the first interactions and a total amount of information of the second interactions, and the calculating the ratio between the contributions of the first and second creators, may comprises comparing the first and second consumption performances and calculating the ratio between the contributions of the first and second creators based on a result of the comparison of the total amount of information of the first interactions and the total amount of information of the second interactions if the result of the comparison of the total amount of information of the first interactions and the total amount of information of the second interactions may corresponds to the result of the comparison of the first and second consumption performances.

In some embodiments, determining a first consumption performance of the first prototype content, wherein the comparing the first interactions and the second interactions, comprises identifying new interactions included among the second interactions, but not among the first interactions, and determining a distribution concentration of the new interactions in the second prototype content and the calculating the ratio between the contributions of the first and second creators, comprises comparing the first and second consumption performances and calculating the ratio between the contributions of the first and second creators based on the distribution concentration of the new interactions in the second prototype content, if the distribution concentration of the new interactions in the second prototype content corresponds to the result of the comparison of the first and second consumption performances.

In some embodiments, wherein the distribution concentration of the new interactions in the second prototype content may be determined based on a number of objects that have become target objects, among the new interactions.

In some embodiments, determining a first consumption performance of the first prototype content, wherein the determining the second consumption performance, may comprises receiving manipulation logs for the second prototype content from a plurality of consumer terminals of the second prototype content, and determining reproduction performances of the second interactions by gathering the received manipulation logs, the comparing the first interactions and the second interactions, may comprises identifying new interactions included among the second interactions, but not among the first interactions, and the calculating the ratio between the contributions of the first and second creators, may comprises comparing the first and second consumption performances and calculating the ratio between the contributions of the first and second creators may based on a number of at least some of the new interactions, if a sum of the reproduction performances of the at least some of the new interactions may corresponds to the result of the comparison of the first and second consumption performances.

In some embodiments, the at least some of the new interactions are interactions having new objects shared with newest interactions, which are interactions of third prototype content, having the same triggers and objects as the newest interactions, or having the same objects and responses as the newest interactions, the third prototype content may be prototype content obtained by editing the second prototype content, the newest interactions are interactions not included among the first interactions and the second interactions, but newly included in the third prototype content, and the new objects are objects may not included in the first prototype content, but newly included in the second prototype content.

In some embodiments, transmitting a second control signal to a prototype editing tool that the second creator logs on to and a third control signal to a prototype editing tool that a third creator of third prototype content logs on to, such that a communication channel may be generated between the second and third creators, wherein the second control signal may includes a control signal allowing information regarding at least some of the new interactions to be displayed on the communication channel as background information.

In some embodiments, determining a first consumption performance of the first prototype content, wherein the comparing the first interactions and the second interactions, may comprises identifying new interactions included among the second interactions, but not among the first interactions, and determining a number of creative interactions, which are new interactions having new trigger-response combinations, new trigger-object combinations, or new object-response combinations, and the calculating the ratio between the contributions of the first and second creators, may comprises comparing the first and second consumption performances and calculating the ratio between the contributions of the first and second creators based on the number of creative interactions, if the number of creative interactions corresponds to the result of the comparison of the first and second consumption performances.

In some embodiments, the determining the second consumption performance, comprises receiving manipulation logs for the second prototype content from a plurality of consumer terminals of the second prototype content, and determining reproduction performances of the second interactions by gathering the received manipulation logs, and the creative interactions are new interactions having new trigger-response combinations, new trigger-object combinations, or new object-response combinations and having a reproduction performance greater than a reference level.

In some embodiments, the creative interactions are new interactions having new trigger-response combinations, new trigger-object combinations, or new object-response combinations, may having a reproduction performance greater than the reference level, and having the same triggers and/or objects as newest interactions, which are interactions of third prototype content, the third prototype content is prototype content may obtained by editing the second prototype content, and the newest interactions are interactions may not included among the first interactions and the second interactions, but newly included in the third prototype content.

In some embodiments, transmitting a second control signal to a prototype editing tool that the second creator logs on to and a third control signal to a prototype editing tool that a third creator of third prototype content logs on to, such that a communication channel may be generated between the second and third creators, wherein the third prototype content may includes newest interactions associated with at least some of new interactions included in the second prototype content, the new interactions are interactions not included among the first interactions, but newly included in the second prototype content, the newest interactions are interactions not included among the first interactions and the second interactions, but newly included in the third prototype content, the newest interactions associated with at least some of the new interactions are interactions having new objects shared with the newest interactions, having the same triggers and objects as the newest interactions, or having the same objects and responses as the newest interactions and the new objects are objects not included in the first prototype content, but newly included in the second prototype content.

According to an aspect of the present disclosure, there is provided a method for evaluating contributions to the creation of an element of a prototype, may comprise acquiring information regarding sales performance of first prototype content, may acquiring information regarding sales performance of second prototype content, which is obtained by editing the first prototype content, comparing the sales performances of the first and second prototype contents, calculating a ratio between contributions of a first creator of the first prototype content and a second creator of the second prototype content to the sales performance of the second prototype content based on a result of the comparison between the sales performances of the first and second prototype contents and automatically distributing profits from the sales of the second prototype content between accounts of the first and second creators based on the calculated ratio between the contributions of the first and second creators.

In some embodiments, receiving a request for the registration of the first prototype content with a prototype market; storing the first prototype content in an online storage and a storage path and a hash value of the first prototype content in a blockchain ledger in response to the receipt of the request for the registration of the first prototype content, receiving a request for the registration of the second prototype content with the prototype market, storing the second prototype content in the online storage and a storage path and a hash value of the second prototype content in the blockchain ledger in response to the receipt of the request for the registration of the second prototype content, identifying a first download count, which may be a number of downloads of the first prototype content, from the blockchain ledger, increasing the first download count, and recording the increased first download count in the blockchain ledger in response to the receipt of a notification of a download of the first prototype content and identifying a second download count, which may be a number of downloads of the second prototype content, from the blockchain ledger, may increasing the second download count, and recording the increased second download count in the blockchain ledger in response to the receipt of a notification of a download of the second prototype content, wherein the automatically distributing the profits, may comprises determining whether a condition for the execution of a smart contract corresponding to the second prototype content has been met, and sending a request for the execution of the smart contract corresponding to the second prototype content to a blockchain network if a determination is made that the condition for the execution of the smart contract corresponding to the second prototype content has been met, and the smart contract corresponding to the second prototype content includes an instruction of executing a transaction of transferring the first creator's share of the profits from a wallet of a service provider running the computing system to a wallet of the first creator based on the calculated ratio between the contributions of the first and second creators and an instruction of executing a transaction of transferring the second creator's share of the profits from the wallet of the service provider to a wallet of the second creator based on the calculated ratio between the contributions of the first and second creators.

According to still another aspect of the present disclosure, there is provided a method for evaluating contributions to the creation of an element of a prototype which may includes determining information regarding consumption performance of second prototype content, which includes an edited version of a first component of first prototype content, acquiring a number of other prototype contents than the second prototype content that include the edited version of the first component and calculating a ratio between contributions of a first creator of the first prototype content and a second creator of the second prototype content to the consumption performance of the second prototype content based on the number of other prototype contents.

In some embodiments, the first component may includes a layer set and interactions associated with objects included in the laser set, the edited version of the first component includes at least one new interaction associated with the first component, an edited layer set of the first component, and/or a new interaction associated with the edited layer set, and the at least one new interaction associated with the first component may be an interaction having a new trigger and/or a new response for an object included in the layer set of the first component.

In some embodiments, the second prototype content includes a plurality of interactions, the determining the information regarding the consumption performance of the second prototype content, comprises receiving manipulation logs for the second prototype content from a plurality of consumer terminals of the second prototype content, and determining reproduction performances of the second interactions by gathering the received manipulation logs, the acquiring the number of other prototype contents, comprises acquiring a ratio of the reproduction performance of an interaction associated with the edited version of the first component to the reproduction performances of the interactions of the second prototype content, and the calculating the ratio between the contributions of the first and second creators, comprises calculating the ratio between the contributions of the first and second creators may based on the number of other prototype contents and the acquired ratio of the reproduction performance of the interaction associated with the edited version of the first component.

In some embodiments, the second prototype content further includes edited versions of a second component of the first prototype content, and the acquired ratio of the reproduction performance of the interaction associated with the edited version of the first component is a ratio of the reproduction performance of either an interaction associated with one of the edited versions of the second component or the interaction associated with the edited version of the first component to the reproduction performances of the interactions of the second prototype content.

In some embodiments, the first prototype content includes a plurality of first interactions, the second prototype content includes a plurality of second interactions, the method further comprises comparing the first interactions and the second interactions, and the calculating the ratio between the contributions of the first and second creators, may comprises calculating the ratio between the contributions of the first and second creators based on a result of the comparison of the first interactions and the second interactions.

In some embodiments, further may comprising comparing sales performances of the first and second prototype contents, wherein the calculating the ratio between the contributions of the first and second creators, may comprises calculating the ratio between the contributions of the first and second creators based on a result of the comparison of the sales performances of the first and second prototype contents.

In some embodiments, transmitting a first control signal to a prototype editing tool that the first creator logs on to and a second control signal to a prototype editing tool that the second creator logs on to, such that a communication channel is generated between the first and second creators, wherein the first control signal may includes a control signal allowing information regarding the first component to be displayed on the communication.

In some embodiments, wherein the transmitting the first and second control signals, comprises receiving user input on whether to upload the second prototype content to a prototype market from the second creator who has purchased the first prototype content, and if the received user input indicates that the second creator may intends to upload the second prototype content to the prototype market, transmitting the first control signal to the prototype editing tool that the first creator logs on to and the second control signal to the prototype editing tool that the second creator logs on to.

In some embodiments, wherein the receiving the user input, comprises determining differences between the first and second prototype contents and receiving the user input if the differences exceed a reference level.

According to still another aspect of the inventive concept, there is provided a computer program wherein the computer program may be combined with a computing device to execute steps may comprising, of determining a second consumption performance of second prototype content, which includes a plurality of second interactions and is obtained by editing first prototype content including a plurality of first interactions, an instruction of comparing the first interactions and the second interactions, and an instruction of calculating a ratio between contributions of a first creator of the first prototype content and a second creator of the second prototype content to the second consumption performance based on a result of the comparison of the first interactions and the second interactions.

BRIEF DESCRIPTION OF THE DRAWINGS

The above and other aspects and features of the present disclosure will become more apparent by describing in detail exemplary embodiments thereof with reference to the attached drawings, in which:

FIG. 4 is a flowchart illustrating a method of evaluating contribution to the creation of the elements of a prototype according to some embodiments of the present disclosure;

FIG. 6 is a table showing reproduction performance data for interactions that can be configured by the method of FIG. 5;

FIG. 11 is a flowchart illustrating a method of evaluating the contribution to the creation of an element of a prototype according to some embodiments of the present disclosure.

DETAILED DESCRIPTION

[Prototype Content]

Figure 1:
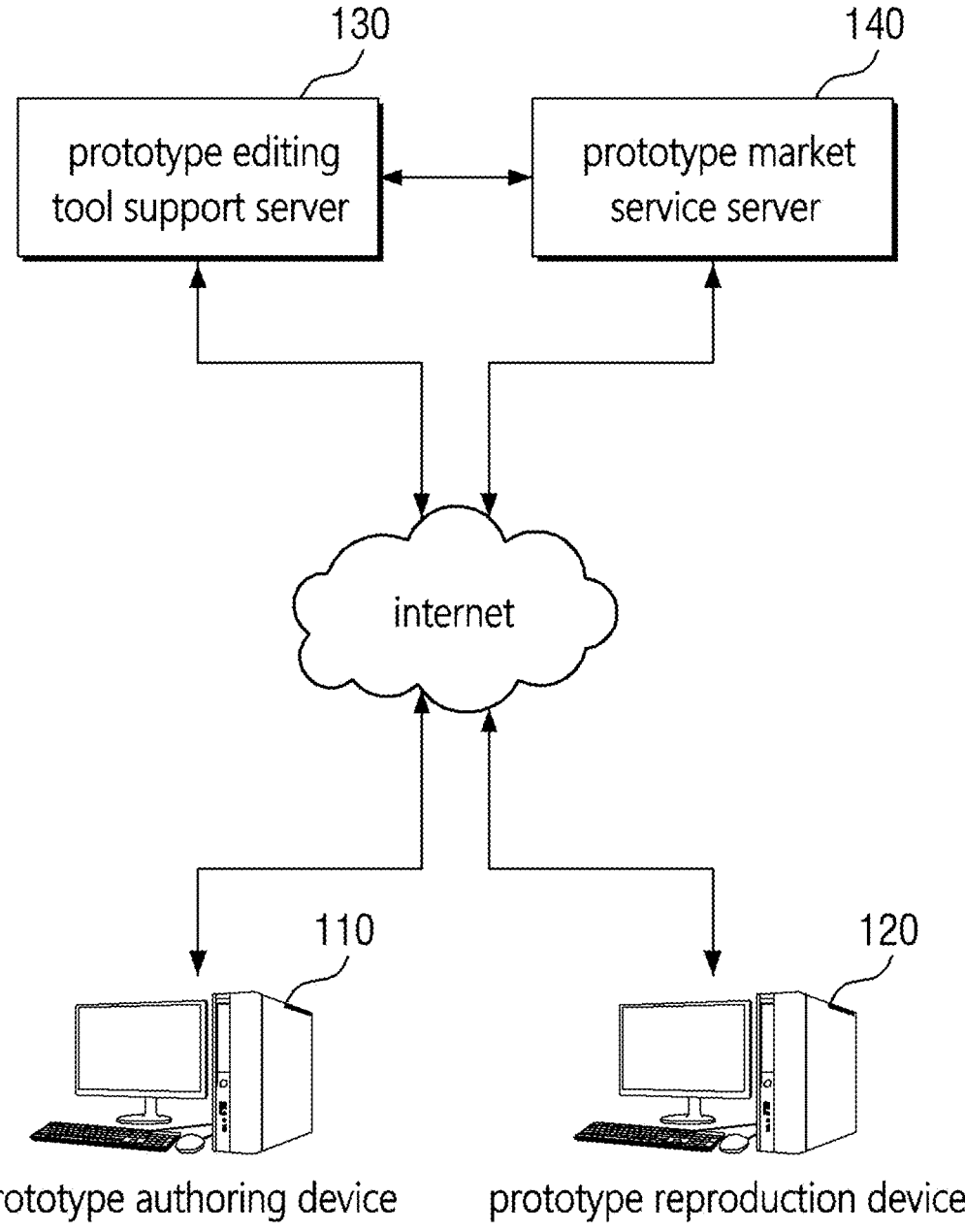
FIGS. 1 and 2 are block diagrams of prototyping systems according to some embodiments of the present disclosure.

The term "prototype content," as used herein, refers to user interface (UI) mockup content consisting of one or more interactions, and prototype content may also be referred to simply as a protype. As already mentioned above, each interaction may consist of a trigger, an object, and a response. Prototype content may be created or edited by a prototyping content authoring tool and may be reproduced by a prototype reproduction apparatus where a prototype reproduction program is installed. Prototype content may be registered with a prototype market and may thereby be disclosed to multiple users. A prototype creator may register his or her prototype content with the prototype market for a fee or for free.

It is assumed that not only first prototype content, but also second prototype content, which is obtained by editing the first prototype content, may be registered with the prototype market. The first prototype content may also be referred to as parent prototype content, and the second prototype content may also be referred to as child prototype content.

Prototype content may be digital data including graphic object data, which includes data defining one or more interaction and one or more layers of one or more objects.

The term "trigger," as used herein, refers to an event triggering a visual change on a graphical user interface (GUI) or an arbitrary reaction or feedback of a device where the GUI is implemented. A trigger may be user input on the GUI, other external input such as that from a sensor, or another event occurring on the GUI. A trigger may also be touch input or gesture for a touch screen provided in the device where the GUI is implemented, user input made with a device such as a mouse or keyboard, or an event triggered by measurement data from a sensor (e.g., a camera, a microphone, an acceleration sensor, a gyro sensor, a proximity sensor, a geomagnetic sensor, an illuminance sensor, a temperature sensor, or a human body sensor) provided in or outside the device where the GUI is implemented.

The term "response," as used herein, refers to a reaction triggered by a trigger. For example, a response may be a change in the display attributes of an object of a GUI (e.g., position, size, transparency, color, or azimuth). In this example, the output of the response may refer to the execution of an operation that changes the display attributes of the object of the GUI. In another example, a response may be haptic or sound feedback from a device where a GUI is implemented. A response may function as a trigger causing another response.

A trigger may be defined to cause different responses depending on the terms for the generation of the trigger.

[Consumption of Prototype Content]

The term "consumption of prototype content," as used herein, may encompass at least some of the following processes: purchasing and downloading prototype content from a prototype market; opening and manipulating the prototype content to reproduce various interactions implemented in the prototype content; and editing the prototype content and registering the edited prototype content with the prototype market.

For example, the consumption performance of prototype content may be determined by the number of downloads of the prototype content and the number of child prototype contents of the prototype content. For example, the consumption performance of the prototype content may be determined by the number of downloads of the prototype content and may be controlled by the number of child prototype contents of the prototype content.

[Creator]

The term "creator," as used herein, refers to a prototype content creator such as, for example, a UI designer. A creator may create prototype content first-hand using a prototype content authoring tool installed in his or her terminal or may create prototype content second-hand by downloading another creator's prototype content from a prototype market and editing the downloaded prototype content. That is, the term "creator" refers not only to the creator of original prototype content, but also anyone who adapts the original prototype content by making modifications.

[Editing of Prototype Content]

The term "editing," as used herein, may refer to deleting or editing some of a plurality of interactions included in prototype content and/or adding one or more interactions to the prototype content. The addition of an interaction to prototype content may be performed by adding an individual interaction or component.

[Component]

A component includes a layer set having one or more layers and interactions associated with objects included in the layer set. The term "layer," as used herein, refers to an imaginary surface including one or more objects, and all objects included in the same layer may have the same z value, which denotes the order in which layers are stacked. A layer having a smallest z value, among a plurality of layers in the same region, is displayed on a screen.

1. Prototyping System

Figure 2:
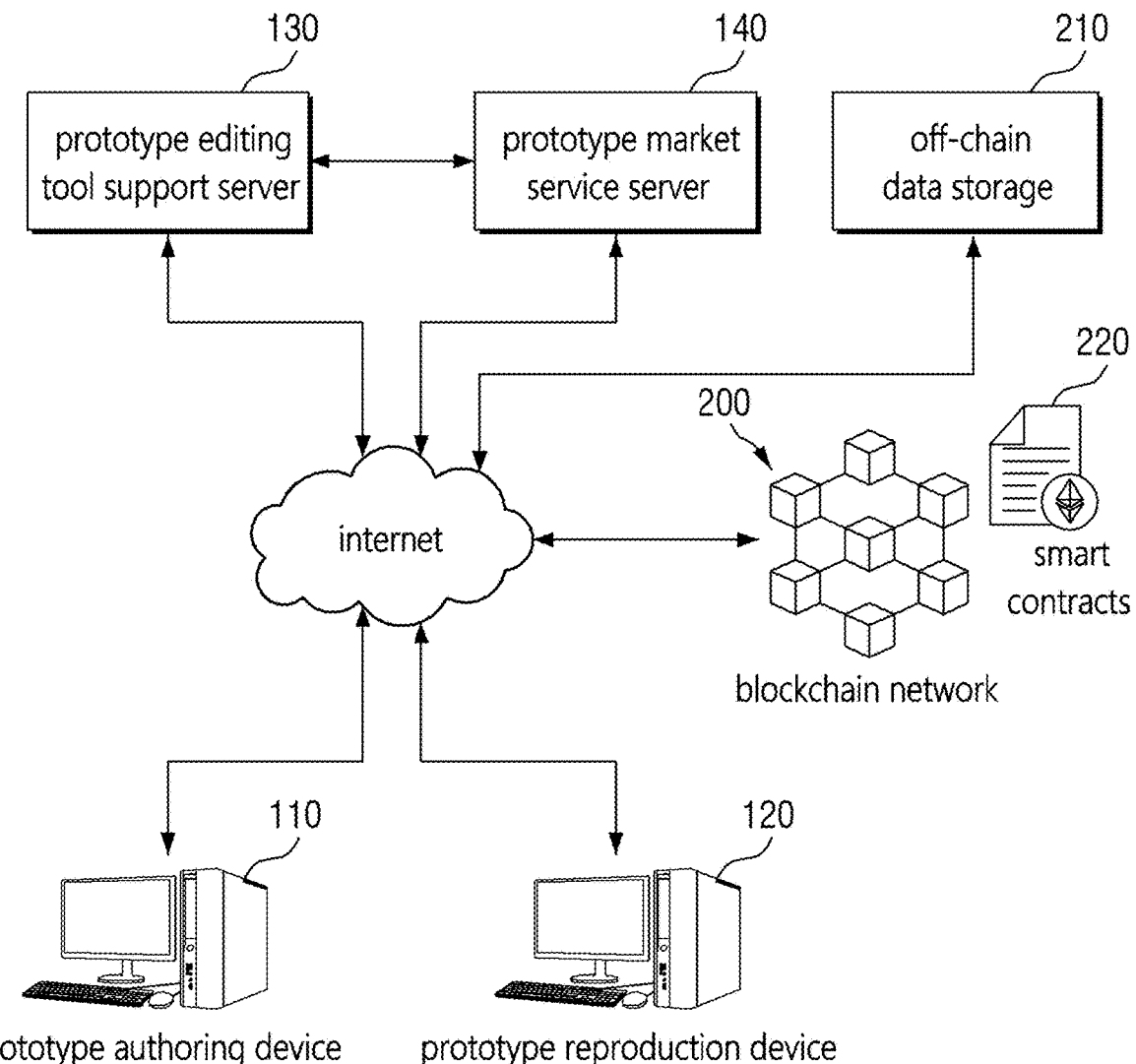

The configuration and operation of prototyping systems according to some embodiments of the present disclosure will hereinafter be described with reference to FIGS. 1 and 2. FIGS. 1 and 2 illustrate different types of prototyping systems according to some embodiments of the present disclosure. The prototyping systems according to some embodiments of the present disclosure may automatically evaluate the contribution of the creator of parent prototype content and the creator of child prototype content to the consumption performance of the child prototype content and may perform subsequent processes such as distributing the profits from the sales of the child prototype content between the creator of the parent prototype content and the creator of the child prototype content.

Referring to FIG. 1, the prototyping system may include a prototype authoring device 110, in which a prototype authoring tool is installed, and a prototype editing tool support server 130, which serves as a service server for the prototype authoring tool. The prototype editing tool support server 130 may perform the following functions: providing a cloud storage for storing and sharing prototype content; and sending created prototype content to a prototype reproduction device 120, in which a prototype reproduction application is installed.

The prototyping system may further include a prototype market service server 140. A creator may create prototype content with the prototype authoring tool and may register the created prototype content with a prototype market by uploading the created prototype content to the market service server 140 and entering metadata regarding the uploaded prototype content and the terms for the sales and disclosure of the uploaded prototype content.

The prototype content may have its own identifier (ID), and each interaction, component, layer, and object of the prototype content may also have their own IDs. Thus, the prototype market service server 140 may manage the prototype content with these IDs. For example, when there is a request for the registration of the child prototype content with the prototype market, the prototype market service server 140 may match and store the ID of the child prototype content and the ID of the parent prototype content as a parent-child relationship.

In this manner, the prototype market service server 140 may distribute the profits from the sales of the second prototype content not only to the creator of the child prototype content, but also to the creator of the parent prototype content, when necessary, based on the level of contribution of the creator of the parent prototype content. As prototype content can be edited in the order of 3 or greater, the profits from the sales of the second prototype content can be distributed not only to the creator of the parent prototype content, but also to the creator of the grandparent prototype content.

In order to distribute the profits from the sales of the child prototype content, the evaluation of the contributions of the creators of the parent and child prototype contents to the creation of the child prototype content is needed and may be performed by the prototype market service server 140 or a separate contribution evaluation device (not illustrated).

The present disclosure suggests various exemplary methods of evaluating the contribution of each creator. These exemplary methods have been prepared to evaluate the contribution of each creator in accordance with a set of evaluation criteria that are produced in consideration that prototype content can be created, passing through the hands of multiple creators. The exemplary methods of evaluating the contribution of each creator will hereinafter be described briefly and in further detail later with reference to FIG. 3.

In some embodiments, the interactions of the parent prototype content and the interactions of the child prototype content may be compared, and the ratio between the contributions of the creator of the parent prototype content and the creator of the child prototype content may be calculated based on the result of the comparison.

When the ratio between the contributions of creators is referred to as being calculated using particular information, it may mean that not only the particular information, but also another additional information may be used to calculate the ratio between the contributions of the creators.

In some embodiments, the sales performance of the parent prototype content and the sales performance of the child prototype content may be compared, and the ratio between the contributions of the creator of the parent prototype content and the creator of the child prototype content may be calculated based on the result of the comparison.

In some embodiments, if a particular component of the parent prototype content is edited in more than one child prototype content of the parent prototype content, the corresponding number of child prototype contents of the parent prototype content may be calculated, and the ratio between the contributions of the creator of the parent prototype content and the creators of the child prototype contents of the parent prototype content may be calculated based on the result of the calculation.

Referring to FIG. 2, the prototyping system may be connected to a blockchain network 200. The blockchain network 200 may include a plurality of blockchain nodes (not illustrated), and the blockchain nodes are computing devices that distribute and store a blockchain ledger. The prototype market service server 140 may convert information regarding registered prototype content into transactions and may send a transaction record request to the blockchain network 200. Alternatively, the transaction record request to the blockchain network 200 may be sent by a separate computing device (not illustrated).

It will hereinafter be described how the prototype market service server 140 distributes/stores information regarding prototype content to/in the blockchain network 200.

When the prototype market service server 1400 receives a request for the registration of the first prototype content, the first prototype content is stored in an off-chain storage 210, which functions as an off-chain data storage, and a transaction record request is sent to the blockchain network 200 such that the storage path and the hash value of the first prototype content are recorded in the blockchain ledger.

As prototype content is generally too large to be stored in the blockchain ledger, the first prototype content may be stored in the off-chain data storage 210, and only the storage path and the hash value of the first prototype content may be recorded in the block chain ledger. In some embodiments, the off-chain data storage 210 may be a storage device of a cloud storage service that stores and shares prototype content provided by the prototype editing tool support server 130. That is, the off-chain data storage 210 may include a first storage space for storing and sharing prototype content created by a prototype editing tool and a second storage space for storing prototype content to be registered with the prototype market.

The blockchain nodes of the block chain network 200 may execute smart contracts 220 in parallel. In this process, access to prototype content registered in the prototype market may be needed. For example, in order to distribute the consumption performance of the child prototype content, the contributions of the creator of the parent prototype content and the creator of the child prototype content need to be evaluated. To this end, the interactions of the parent prototype content and the interactions of the child prototype content may be compared by accessing prototype content data stored in the off-chain data storage 210 via the off-chain storage paths of the parent prototype content and the child prototype content that are stored in the blockchain ledger.

For the above reasons, network architectures for first storage devices that provide the first storage space and for second storage devices that provide the second storage space may be configured such that the first storage devices and the second storage devices can stably handle first input/output (I/O) traffic and second I/O traffic, respectively. The second I/O traffic may be fixed and may be greater than the I/O traffic. Alternatively, the second I/O traffic may be variable may increase from a particular initial value greater than the first I/O traffic with the number of smart contracts 220.

The prototyping system of FIG. 2 includes the off-chain data storage 210, which provides the first and second storage spaces. As the I/O traffic of the second storage space is configured to be greater than the I/O traffic of the first storage space, the off-line data storage 210 can properly support the smart contracts 220 of the blockchain network 200 to be stably executed. Also, as a cloud storage service for storing and sharing prototype content provided by the prototype editing tool support sever 130 is provided via the off-chain data storage 210, a system capable of implementing both the cloud storage service and the off-chain data storage 210 can be provided by efficiently utilizing system resources.

When the prototype market service server 140 receives a request for the registration of the second prototype content from the terminal of the creator (hereinafter, the first creator) of the first prototype content, the prototype market service server 140 stores the second prototype content in the off-chain data storage 210 and sends a transaction record request to the blockchain network 200 such that the storage path and the hash value of the second prototype content can be recorded in the blockchain ledger.

When the first or second prototype content is downloaded, the prototype market service server 140 may transmit a transaction record request to the blockchain network 200, either instantly or in a batch, such that updated download information regarding the first or second prototype content may be recorded in the blockchain ledger.

For example, in response to receipt of a notification of the download of the first prototype content, the prototype market service server 140 may identify a first download count, which is the number of downloads of the first prototype content, from the blockchain ledger, may increase the first download count, and may send a transaction record request to record the increased first download count in the blockchain ledger. Also, in response to receipt of a notification of the download of the second prototype content, the prototype market service server 140 may identify a second download count, which is the number of downloads of the second prototype content, from the blockchain ledger, may increase the second download count, and may send a transaction record request to record the increased second download count in the blockchain ledger.

Also, the prototype market service server 140 may automatically distribute the profits from the sales of the second prototype content between the account of the first creator and the account of the creator (hereinafter, the second creator) of the second prototype content periodically or non-periodically.

The automatic distribution of the profits from the sales of the second prototype content may include determining whether a condition for the execution of a smart contract 220 corresponding to the second prototype content has been met and sending a request for the execution of the smart contract 220 corresponding to the second prototype content to the blockchain network 200 if a determination is made that the condition for the execution of the smart contract 220 corresponding to the second prototype content has been met.

Specifically, if the profits from the sales of the second prototype content are automatically distributed whenever the second prototype content is downloaded, resources may be used inefficiently. Thus, a determination may be made as to whether the condition for the execution of the smart contract 220 corresponding to the second prototype content is met. For example, the smart contract 220 corresponding to the second prototype content may be executed when the sales amount of the second prototype content reaches a particular level.

In some embodiments, smart contracts 220 may be automatically generated to correspond one-to-one to prototype contents registered in the prototype market. That is, whenever prototype content is registered with the prototype market, a smart contract may be automatically generated in accordance with a profit distribution method designated by the creator of the prototype content.

The smart contract 220 corresponding to the second prototype content may include an instruction of executing the transaction of transferring the first creator's share of the profits from the sales of the second prototype content from the wallet of a service provider running the prototyping system to the wallet of the first creator based on contribution ratio information and an instruction of executing the transaction of transferring the second creator's share of the profits from the sales of the second prototype content from the wallet of the service provider to the wallet of the second creator based on the contribution ratio information.

Figure 3:
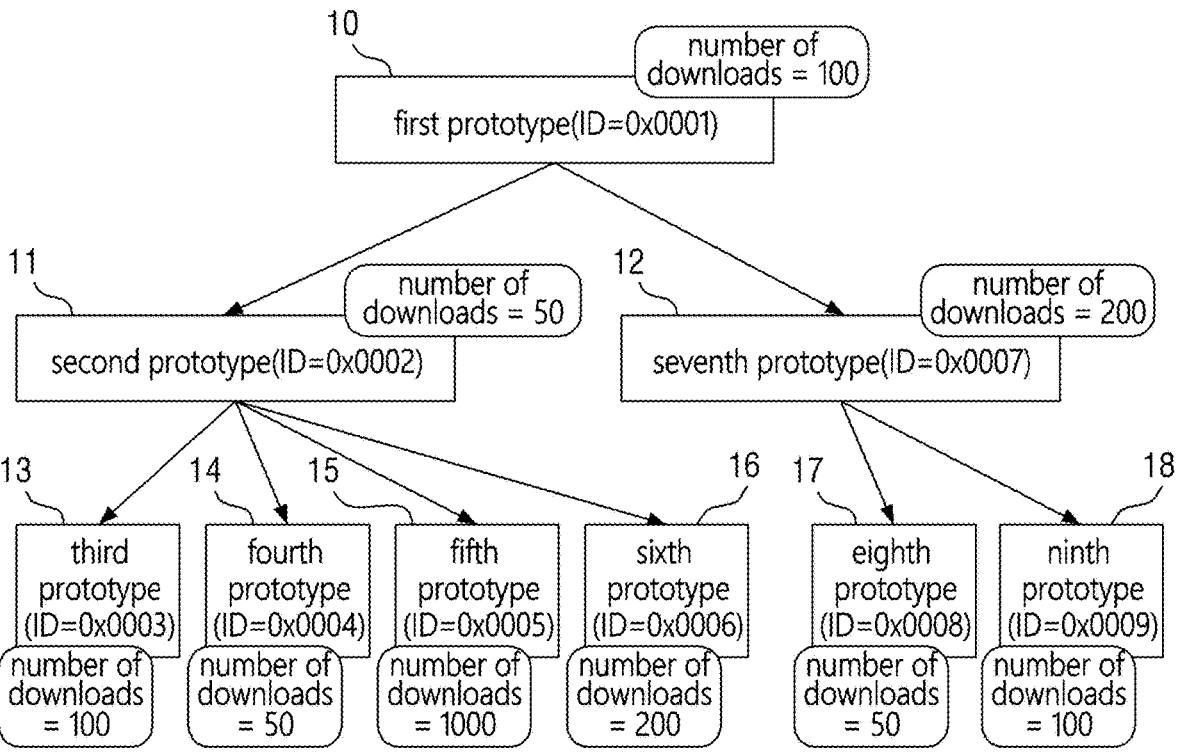
FIG. 3 illustrates a parent-child relationship between prototypes that can be referenced in some embodiments of the present disclosure.
Figure 5:
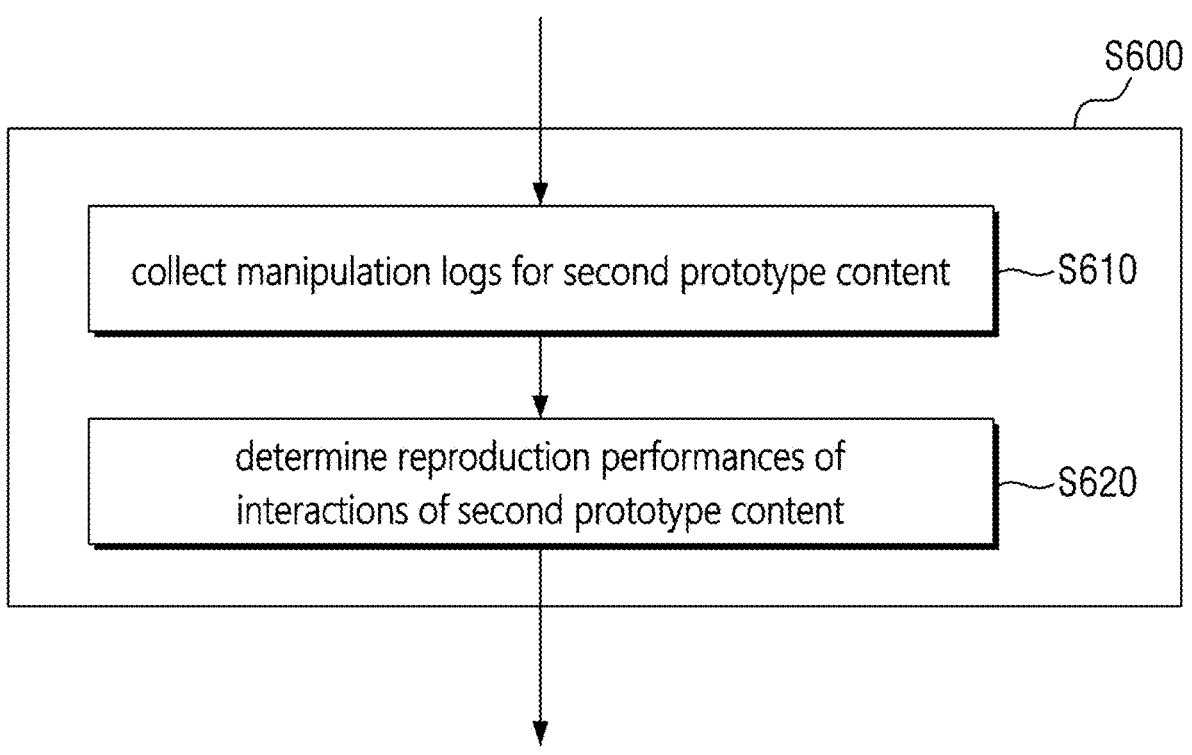
FIG. 5 is a detailed flowchart illustrating some of the steps of the method of FIG. 4.

FIG. 3 illustrates a parent-child relationship between prototypes that can be referenced in calculating a contribution ratio according to some embodiments of the present disclosure. Referring to FIG. 3, one parent prototype may be edited into multiple child prototypes. A first prototype 10 may be edited into second and seventh prototypes 11 and 12. It is assumed that multiple parent prototypes cannot be merged and edited into a single child prototype. That is, the relationship between parent prototypes and child prototypes may naturally form a tree, as illustrated in FIG. 3.

Prototyping systems according to some embodiments of the present disclosure have been described with reference to FIGS. 1 and 2 and are applicable to other embodiments of the present disclosure. Also, embodiments that will hereinafter be described are also applicable to the prototyping systems of FIGS. 1 and 2.

2. Method of Evaluating Contribution to Creation of Prototype Elements

A method (hereinafter, the contribution evaluation method) of evaluating the contribution to the creation of prototype elements according to some embodiments of the present disclosure will hereinafter be described with reference to FIGS. 4 through 11. The contribution evaluation method may be performed by a computing device. For example, some of operations of the contribution evaluation method may be performed by a first computing device, and the other operations of the contribution evaluation method may be performed by a second computing device. For example, some of the operations of the contribution evaluation method may be performed by an on-premise physical server, and the other operations of the contribution evaluation method may be performed by a cloud compute instance. The operations of the contribution evaluation method may be understood as being performed by computing devices, unless specified otherwise.

Referring to FIG. 4, the first prototype content, which is the parent prototype content, may be registered with the prototype market (S100) and may be purchased and downloaded (S200). When a request for the registration of second prototype content, which is obtained by editing the first prototype content, with the prototype market is received (S300), the ID of the first prototype content is identified from header data of the second prototype content (S310), and the second prototype content is registered with the prototype market as child prototype content of the first prototype content (S320).

Thereafter, the second prototype content may be purchased and downloaded (S400). Thereafter, the consumption/download performance of the second prototype content meets a predefined condition for the occurrence of a settlement trigger (S500). If the settlement trigger occurs, the consumption performances of the first and second prototype contents may be determined (S600). The ratio between the contributions of the first and second creators to the consumption performance of the second prototype content may be determined (S700). Then, a predefined settlement process may be performed (S800) based on the contribution ratio determined in S700.

Meanwhile, in some embodiments, the reproduction performances of new interactions, which are interactions that have been edited in the second prototype content, may be considered in determining the ratio between the contributions of the first and second creators. To this end, referring to FIG. 5, manipulation logs for the second prototype content is collected from consumer terminals consuming the second prototype content (S610), and the reproduction performances of interactions of the second prototype content are determined by gathering the manipulation logs (S620).

The consumer terminals are the user terminals of users who have purchased the second prototype content and may have a prototype editing tool or a prototype reproduction application installed therein. That is, the prototype editing tool or the prototype reproduction application may include a manipulation logging module, which generates logs of all user manipulations of prototypes and transmits such log data to a computing system performing the contribution evaluation method of FIG. 4.

FIG. 6 is a table showing reproduction performance data 20 for the interactions of the second prototype content. Referring to FIG. 6, the reproduction performance data 20 may include an interaction ID field 21, a field 22 indicating whether each of the interactions of the second prototype content is a new interaction, a field 23 indicating whether and how many times each of the interactions of the second prototype content has been edited in child prototype contents of the second prototype content, a field 24 indicating the total number of reproductions of each of the interactions of the second prototype content, gathered from all the consumer terminals, and a field 25 indicating the maximum number of reproductions, per unit time (e.g., per minute), of each of the interactions of the second prototype content. Some of the interactions of the second prototype content, i.e., interactions 20a, 20c, and 20d, may be new interactions not included among the first interactions, and some of the new interactions, i.e., the interactions 20a and 20d, may be interactions edited in the child prototype contents of the second prototype content.

As the interaction 20d (i.e., "0x0236AC030EA3D") has the largest total number of reproductions and the largest number of reproductions per unit time and has been edited the largest number of times (i.e., 58 times), the interaction 20d may be determined as being an interaction with the highest consumption performance.

It will hereinafter be described how to determine the ratio between the contributions of the first and second creators to the consumption performance of the second prototype content with reference to FIG. 7.

Figure 7:
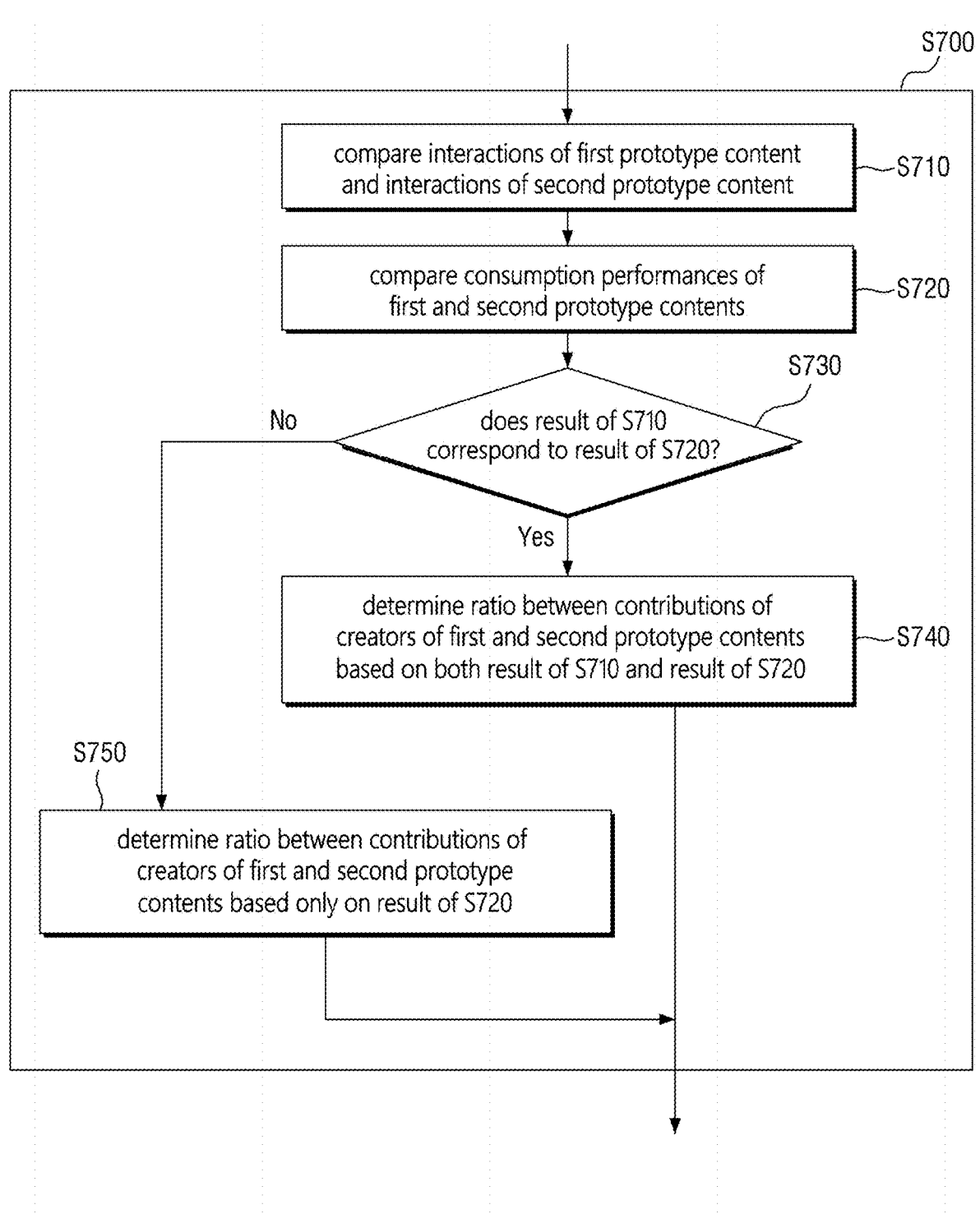
FIG. 7 is a detailed flowchart illustrating some of the steps of the method of FIG. 4.

Referring to FIG. 7, in some embodiments, a plurality of first interactions of the first prototype content and a plurality of second interactions of the second prototype content may be compared (S710), and the consumption performance of the first prototype content and the consumption performance of the second prototype content may be compared (S720).

In some embodiments, in S710, the number of first interactions may be compared with the number of second interactions. Then, if the number of first interactions and the consumption performance of the second prototype content have both increased from the number of first interactions and the consumption performance of the first prototype content, respectively, a determination may be made (S730) that the result of the comparison performed in S710 corresponds to the result of the comparison performed in S720.

When an increase or decrease in the number of second interactions from the number of first interactions tends to correspond to an increase or decrease in the consumption performance of the second prototype content from the consumption performance of the first prototype content, it may be considered that the increase or decrease in the number of second interactions from the number of first interactions has affected the increase or decrease in the consumption performance of the second prototype content.

Accordingly, if the result of the comparison of the first interactions and the second interactions based on the numbers of interactions of the first and second prototype contents corresponds to the result of the comparison of the consumption performance of the first prototype content and the consumption performance of the second prototype content, the ratio between the contributions of the first and second creators, i.e., between the first and second creators, may be calculated (S740) using the result of the comparison of the number of first interactions and the number of second interactions and the result of the comparison of the consumption performance of the first prototype content and the consumption performance of the second prototype content.

On the contrary, if the result of the comparison of the first interactions and the second interactions based on the numbers of interactions of the first and second prototype contents does not correspond to the result of the comparison of the consumption performance of the first prototype content and the consumption performance of the second prototype content, the ratio between the contributions of the first and second creators may be calculated (S750) using only the result of the comparison of the consumption performance of the first prototype content and the consumption performance of the second prototype content.

Alternatively, in some embodiments, in S710, the total amount of information of the first interactions may be compared with the total amount of information of the second interactions. The total amount of information of a plurality of interactions may refer to the size of data defining the plurality of interactions. Here, object data, which is graphic data, is not exactly information and may thus be excluded from determining the total amount of information of the plurality of interactions.

Then, in S730, if the total amount of information of the second interactions and the consumption performance of the second prototype content have both increased from the total amount of information of the first interactions and the consumption performance of the first prototype content, respectively, a determination may be made that the result of the comparison of the first interactions and the second interactions corresponds to the result of the comparison of the consumption performance of the first prototype content and the consumption performance of the second prototype content.

When an increase or decrease in the total amount of information of the second interactions from the total amount of information of the first interactions tends to correspond to an increase or decrease in the consumption performance of the second prototype content from the consumption performance of the first prototype content, it may be considered that the increase or decrease in the total amount of information of the second interactions from the total amount of information of the first interactions has affected the increase or decrease in the consumption performance of the second prototype content.

Accordingly, in S740, if the result of the comparison of the first interactions and the second interactions based on the total amount of information of the first interactions and the total amount of information of the second interactions corresponds to the result of the comparison of the consumption performance of the first prototype content and the consumption performance of the second prototype content, the ratio between the contributions of the first and second creators may be calculated using the result of the comparison of the total amount of information of the first interactions and the total amount of information of the second interactions and the result of the comparison of the consumption performance of the first prototype content and the consumption performance of the second prototype content.

On the contrary, in S750, if the result of the comparison of the first interactions and the second interactions based on the total amount of information of the first interactions and the total amount of information of the second interactions does not correspond to the result of the comparison of the consumption performance of the first prototype content and the consumption performance of the second prototype content, the ratio between the contributions of the first and second creators may be calculated using only the result of the comparison of the consumption performance of the first prototype content and the consumption performance of the second prototype content.

Alternatively, in some embodiments, in S710, new interactions, which are interactions not included among the first interactions, but newly included only in the second prototype content, may be extracted from among the second interactions and may be evaluated.

The evaluation of the new interactions may include determining the distribution concentration of the new interactions in the second prototype content.

The distribution concentration of the new interactions in the second prototype content may be determined using the number of objects that have become target objects, among the new interactions. For example, the less the number of objects that have become target objects, among the new interactions, the higher the distribution concentration of the new interactions in the second prototype content.

Then, in S730, if the distribution concentration of the new interactions in the second prototype content exceeds a first reference level and the consumption performance of the second prototype content has increased from the consumption performance of the first prototype content, a determination may be made that the result of the comparison of the first interactions and the second interactions corresponds to the result of the comparison of the consumption performance of the first prototype content and the consumption performance of the second prototype content. That is, a determination may be made that as the new interactions are concentrated on a small number of objects in the second prototype content, the consumption performance of the second prototype content has increased.

When the distribution concentration of the new interactions in the second prototype content tends to correspond to an increase or decrease in the consumption of the second prototype content from the consumption performance of the first prototype content, it may be considered that the distribution concentration of the new interactions in the second prototype content has affected the increase or decrease in the consumption performance of the second prototype content.

Accordingly, in S740, if the result of the comparison of the first interactions and the second interactions based on the distribution concentration of the new interactions in the second prototype content corresponds to the result of the comparison of the consumption performance of the first prototype content and the consumption performance of the second prototype content, the ratio between the contributions of the first and second creators may be calculated using the distribution concentration of the new interactions in the second prototype content and the result of the comparison of the consumption performance of the first prototype content and the consumption performance of the second prototype content.

On the contrary, in S750, if the result of the comparison of the first interactions and the second interactions based on the distribution concentration of the new interactions in the second prototype content does not correspond to the result of the comparison of the consumption performance of the first prototype content and the consumption performance of the second prototype content, the ratio between the contributions of the first and second creators may be calculated using only the result of the comparison of the consumption performance of the first prototype content and the consumption performance of the second prototype content.

Alternatively, the evaluation of the new interactions may include determining the reproduction performances of the new interactions. It will hereinafter be described how to determine the reproduction productions of the second interactions with reference to FIGS. 5 and 6.

The sum of the reproduction performances of at least some of the new interactions may be calculated as the result of the comparison of the first interactions and the second interactions. That is, the reproduction performances of all the new interactions or some of the new interactions that have been edited in child prototype contents of the second prototype content may be summed up as the result of the comparison of the first interactions and the second interactions.

In other words, only the new interactions that have been edited in the child prototype contents of the second prototype content may be considered as the cause of a significant change in the consumption performance of the second prototype content, and thus, the reproduction performances of only the new interactions that have been edited in the child prototype contents of the second prototype content may be summed up.

Among the new interactions, interactions edited in third prototype content, which is child prototype content of the second prototype content, may be interactions having new objects shared with newest interactions, which are interactions of the third prototype content, having the same triggers and objects as the newest interactions, or having the same objects and responses as the newest interactions. The third prototype content is prototype content obtained by editing the second prototype content, and the newest interactions may be interactions not included among the interactions of each of the first and second prototype contents, but newly included only in the third prototype content.

Then, in S730, if the sum of the reproduction performances of at least some of the new interactions exceeds a second reference level and the consumption performance of the second prototype content has increased from the consumption performance of the first prototype content, a determination may be made that the result of the comparison of the first interactions and the second interactions corresponds to the result of the comparison of the consumption performance of the first prototype content and the consumption performance of the second prototype content.

That is, if the new interactions have been manipulated in the consumer terminals to the extent that the sum of the reproduction performances of at least some of the new interactions exceeds the second reference level, it may be considered that the new interactions have lead the increase in the consumption performance of the second prototype content.

Accordingly, in S740, if the result of the comparison of the first interactions and the second interactions based on the sum of the reproduction performances of at least some of the new interactions corresponds to the result of the comparison of the consumption performance of the first prototype content and the consumption performance of the second prototype content, the ratio between the contributions of the first and second creators may be calculated using the number of new interactions whose reproduction performances have been summed up and the result of the comparison of the consumption performance of the first prototype content and the consumption performance of the second prototype content.

On the contrary, in S750, if the result of the comparison of the first interactions and the second interactions based on the sum of the reproduction performances of at least some of the new interactions does not correspond to the result of the comparison of the consumption performance of the first prototype content and the consumption performance of the second prototype content, the ratio between the contributions of the first and second creators may be calculated using only the result of the comparison of the consumption performance of the first prototype content and the consumption performance of the second prototype content.

Alternatively, the evaluation of the new interactions may include evaluating the novelty of each of the new interactions. For example, the number of "creative interactions", which are new interactions having new trigger-response combinations, new trigger-object combinations, or new object-response combinations, may be determined. The new trigger-response combinations, the new trigger-object combinations, and the new object-response combinations may be trigger-response combinations, trigger-object combinations, and object-response combinations, respectively, that are not included in the first prototype content.

In some embodiments, some of the new interactions that meet a strict requirement, for example, new interactions having a reproduction performance greater than the second reference level, may be selected as the "creative interactions."

In some embodiments, some of the new interactions that meet a stricter requirement, for example, new interactions not only having a reproduction performance greater than the second reference level, but also having the same triggers and/or objects as the newest interactions, may be selected as the "creative interactions." That is, the new interactions that meet the stricter requirement may be understood as new second interactions that have a reproduction performance greater than the second reference level and are additionally being edited in the third prototype content.

The number of "creative interactions" may be calculated as the result of the comparison of the first interactions and the second interactions. That is, only some of the new interactions that meet the requirement(s) of the "creative interactions" may be considered as having caused a significant change in the consumption performance of the second prototype content.

Then, in S730, if the number of "creative interactions" exceeds a third reference level and the consumption performance of the second prototype content has increased from the consumption performance of the first prototype content, a determination may be made that the result of the comparison of the first interactions and the second interactions corresponds to the result of the comparison of the consumption performance of the first prototype content and the consumption performance of the second prototype content. That is, if the number of "creative interactions" exceeds the third reference level, the new interactions may be considered as having led the increase in the consumption performance of the second prototype content.

Accordingly, in S740, if the result of the comparison of the first interactions and the second interactions based on the number of "creative interactions" corresponds to the result of the comparison of the consumption performance of the first prototype content and the consumption performance of the second prototype content, the ratio between the contributions of the first and second creators may be calculated using the number of "creative interactions" and the result of the comparison of the consumption performance of the first prototype content and the consumption performance of the second prototype content.

On the contrary, in S750, if the result of the comparison of the first interactions and the second interactions based on the number of "creative interactions" does not correspond to the result of the comparison of the consumption performance of the first prototype content and the consumption performance of the second prototype content, the ratio between the contributions of the first and second creators may be calculated using only the result of the comparison of the consumption performance of the first prototype content and the consumption performance of the second prototype content.

The editing of the new interactions in child prototype content of the second prototype content may be understood as favorably affecting the contribution of the second creator. Thus, the second creator may wish for the new interactions to be actively edited and reprocessed.

Given this, in some embodiments, a communication channel may be generated between the second creator and a third creator who is the creator of the third prototype content including newest interactions associated with the new interactions.

In some embodiments, the newest interactions associated with the new interactions may be interactions having new objects shared with the newest interactions, having the same triggers and objects as the newest interactions, or having the same objects and responses as the newest interactions.

Figure 8:
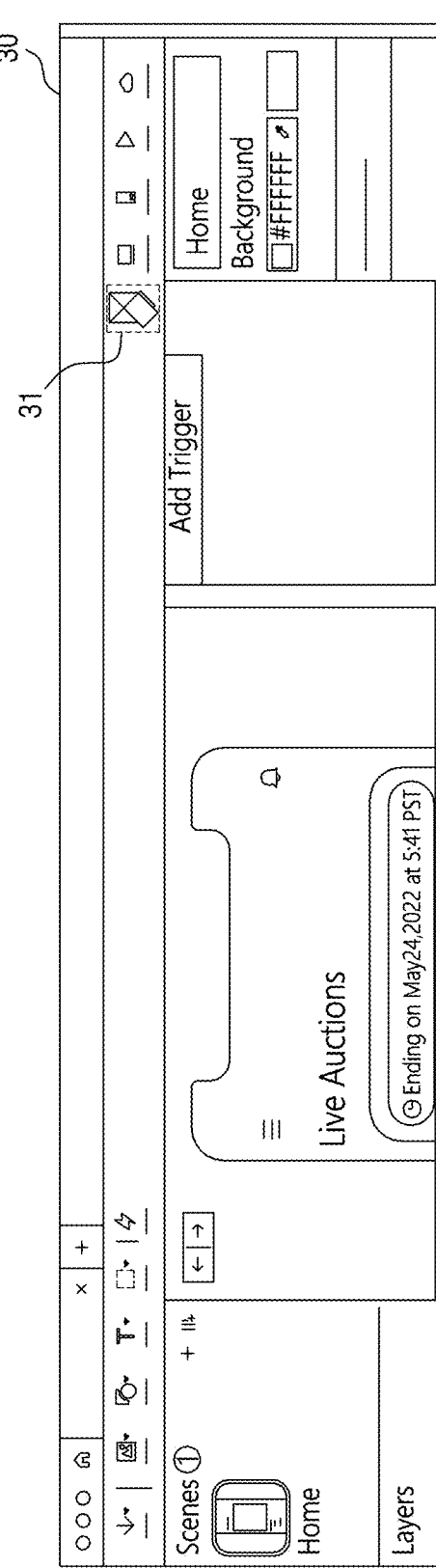
FIGS. 8 through 10 illustrate exemplary user interface (UI) screens associated with a communication channel that can be provided between creators according to some embodiments of the present disclosure.
Figure 9:
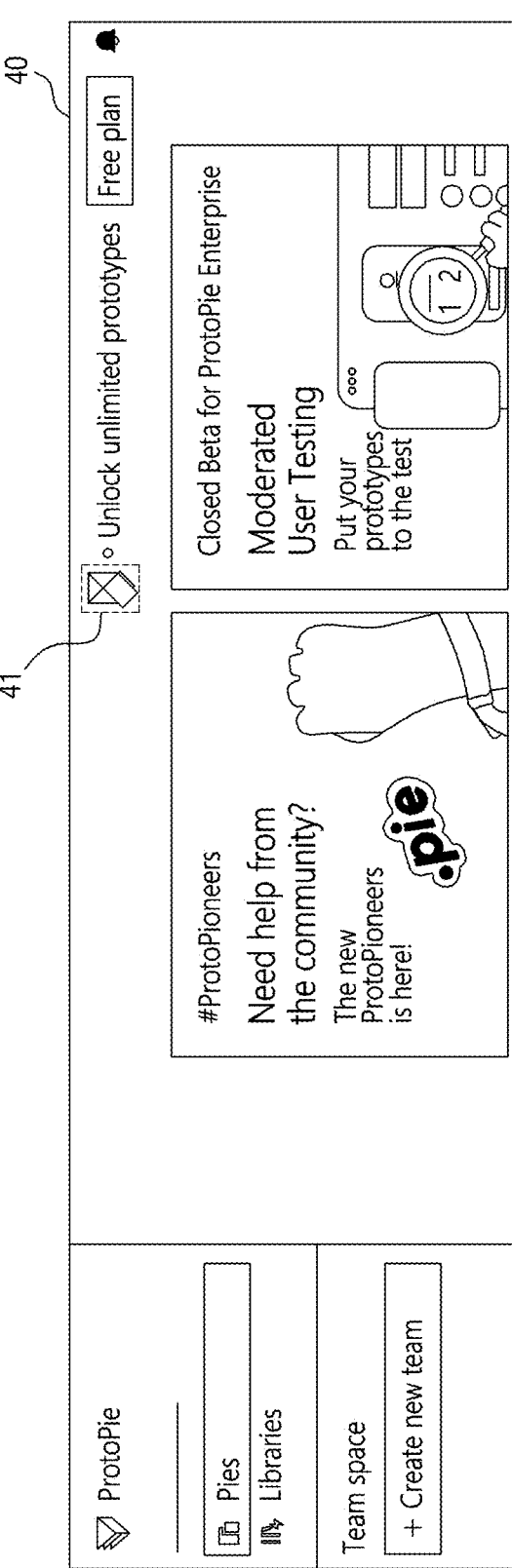

Referring to FIGS. 8 and 9, a communication channel may be opened up by choosing a button 31 on a screen 30 of a prototype editing tool or a button 41 on a cloud storage service page 40 provided for the user of the prototype editing tool.

Figure 10:
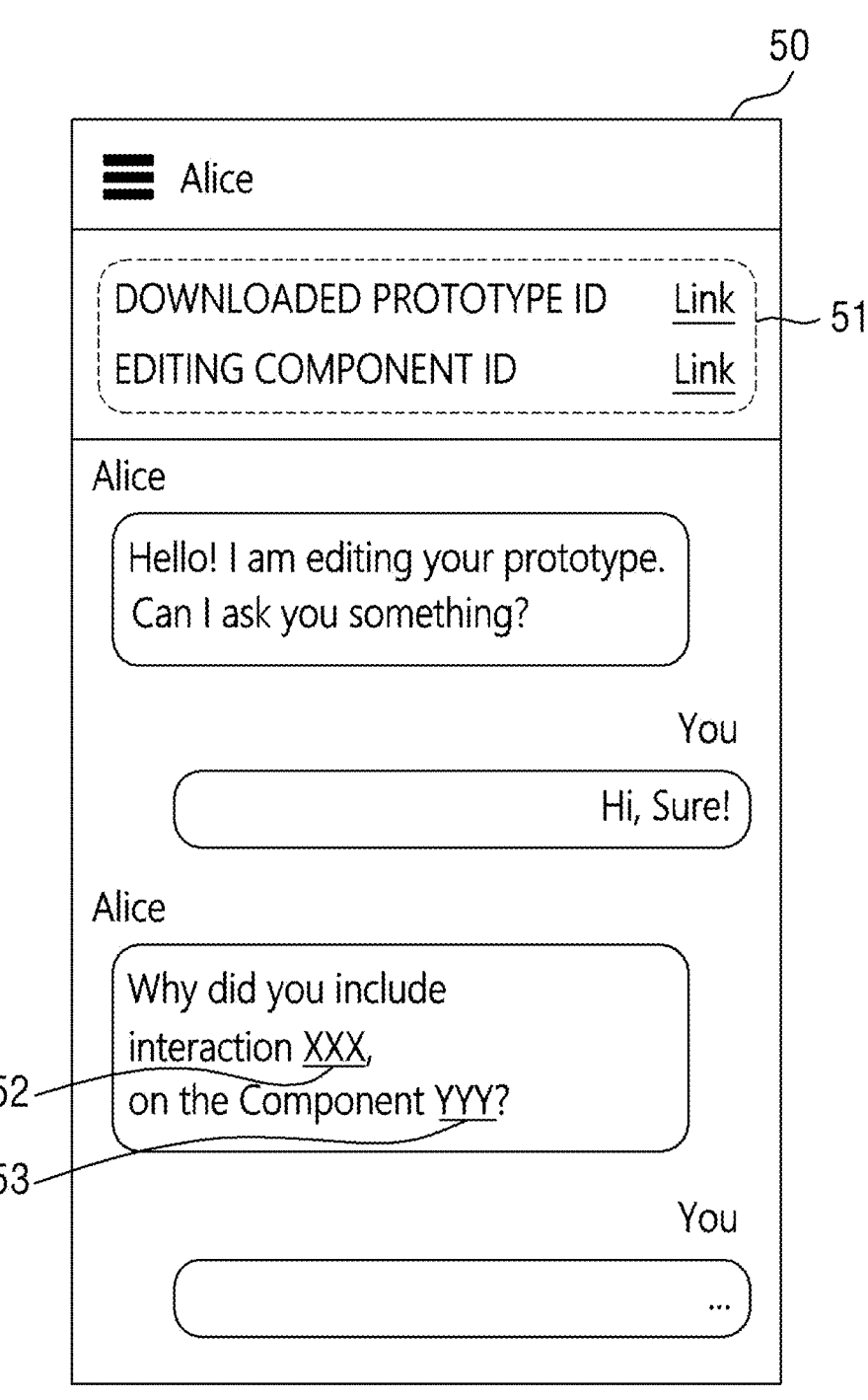
Figure 12:
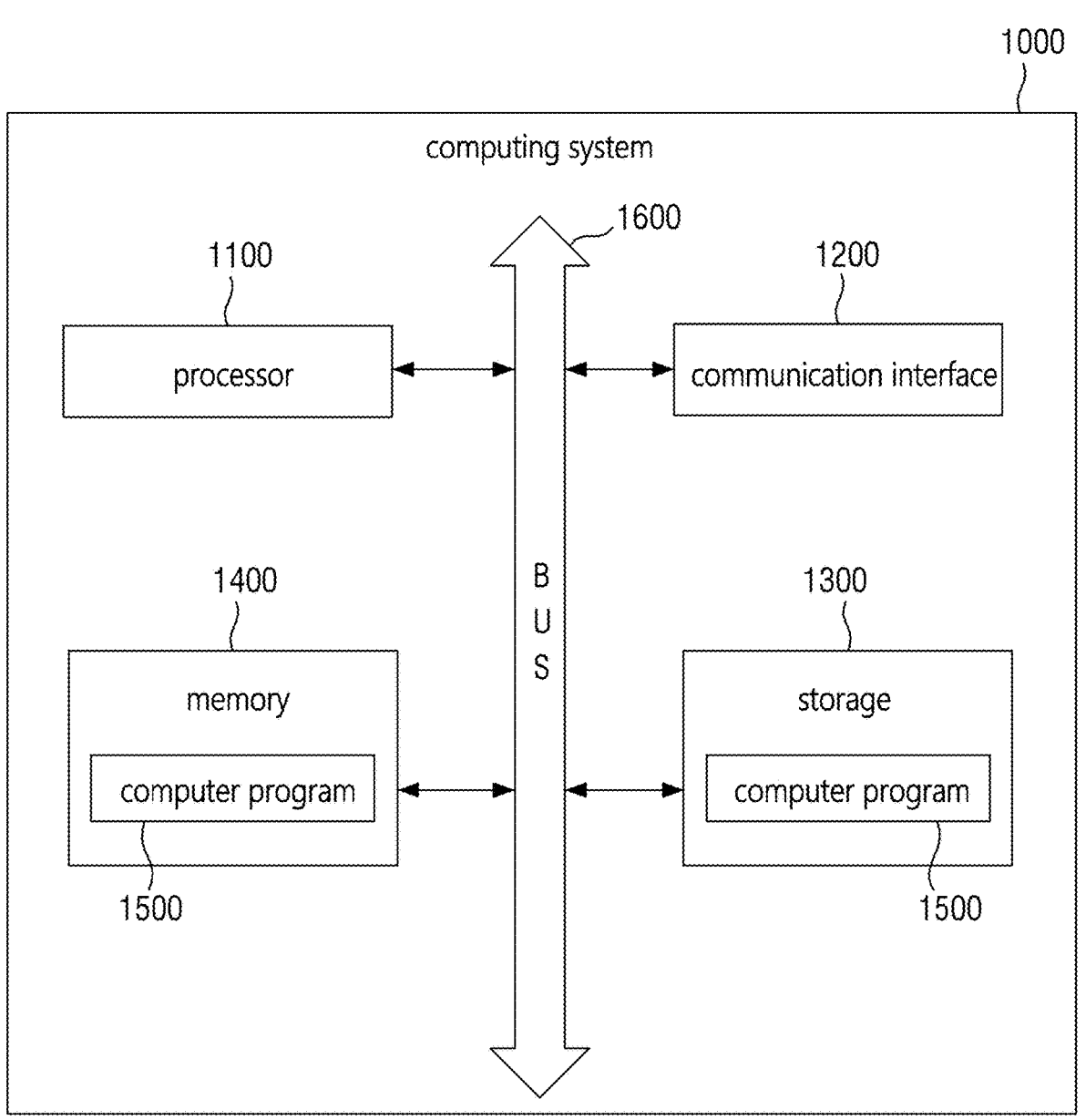
FIG. 12 is a hardware configuration view of a computing system according to some embodiments of the present disclosure.

FIG. 10 illustrates an exemplary communication channel window 50 displayed on the terminal of the second creator.

The second creator may not know which of the interactions of the second prototype are being edited by the third creator (or "Alice").

Thus, background information including the ID of the second prototype content, which is the parent of the third prototype content, a connection link to the second prototype content, the ID of a new interaction of the second prototype content that is being edited in the third prototype content by Alice, and a connection link to the corresponding new interaction of the second prototype content may be displayed in the communication channel window 50, which is on the second creator's side.

Also, background information 51 including the ID of the second prototype content, the connection link to the second prototype content, the ID of a component of the second prototype content that is being edited by Alice, and a connection ink to the corresponding component of the second prototype content may be displayed on the communication channel window 50.

The communication channel window 50 may be displayed when the prototype editing tool receives a control signal, which includes information regarding a communication channel, from a server and a creator (e.g., the third creator or Alice) who has downloaded the second prototype content from the prototype market and is editing the downloaded second prototype content enters user input indicating that he or she intends to upload the prototype content that he or she is editing to the prototype market. A control signal received by the terminal of the second creator may include information regarding an interaction or component of the prototype content currently being edited.

If the amount by which the downloaded second prototype content has been edited exceeds a reference level, the prototype editing tool may display a query message for receiving user input on whether to upload the edited second prototype content. The amount by which the downloaded second prototype content has been edited may refer to differences between the interactions of the downloaded second prototype content and the interactions of the edited second prototype content. For example, the amount by which the downloaded second prototype content has been edited may refer to the ratio or the number of interactions of the downloaded second prototype content that have been edited. The edited interactions may refer to interactions of the downloaded second prototype content that have their triggers, responses, and/or objects edited.

In some embodiments, interaction information and component information included in a message displayed in the communication channel window 50 may be automatically replaced with links 52 and 53. Accordingly, the second creator can instantly identify an interaction and a component of the second prototype content that the third creator is referring to from the links 52 and 53.

A contribution evaluation method according to some embodiments of the present disclosure will hereinafter be described with reference to FIG. 11. The contribution evaluation method of FIG. 11, unlike the contribution evaluation method of FIG. 4, may further include, if a first component of the first prototype content has been edited in the second prototype content, calculating the number of times the first content has been edited in other child prototype contents than the second prototype content (S650).

Specifically, referring to FIG. 11, if the first component has also been edited actively in other child prototype contents, the ratio between the contributions of the first and second creators, i.e., the first and second creators, may be calculated such that the first creator's share may be increased.

In other words, if the first creator has created the first component and has registered the first prototype content together with the first component with the prototype market and the first component has been edited in multiple other child prototype contents, it may be considered that the utilization of the first component is high, and thus, if the second prototype content including an edited version of the first component has exhibited an excellent consumption performance, the contribution of the first creator may be calculated based on the utilization of the first component. That is, the greater the number of child prototype contents where the first component has been edited, the greater the contribution of the first creator.

Here, the edited version of the first component may include at least one new interaction associated with the first component, an edited layer set of the first component, and/or a new interaction associated with the edited layer set of the first component. The at least one new interaction associated with the first component may be an interaction having a new trigger and/or a new response for an object included in the layer set of the first component.

In some embodiments, in S700, the ratio of the reproduction performance of an interaction associated with the edited version of the first component to the reproduction performances of the second interactions may be calculated, and the ratio between the contributions of the first and second creators may be calculated using the number of other child prototype contents where the first component has been edited and the ratio of the reproduction performance of the interaction associated with the edited version of the first component to the reproduction performances of the second interactions. That is, the greater the ratio of the reproduction performance of the interaction associated with the edited version of the first component to the reproduction performances of the second interactions, the greater the contribution of the first creator.

The second prototype content may further include edited versions of a second component included in the first prototype content, and in S700, the ratio of the reproduction performance of either an interaction associated with one of the edited versions of the second component or the interaction associated with the first component to the reproduction performances of the second interactions may be calculated.

In some embodiments, in S700, the ratio between the contributions of the first and second creators may be calculated further using the result of the comparison of the first interactions and the second interactions, as already mentioned above.

In some embodiments, in S700, the ratio between the contributions of the first and second creators may be calculated further using the result of the comparison of the sales performance of the first prototype content and the sales performance of the second prototype content. That is, the greater the number of child prototype contents where the first component has been edited and the greater the sales performance of the first prototype content, the greater the contribution of the first creator.

What is claimed is:

1. A method of evaluating contributions to a creation of an element of a prototype, the method being performed by a computing system and comprising:

determining information regarding consumption performance of second prototype content, which includes an edited version of a first component of first prototype content;

acquiring a number of other prototype contents than the second prototype content that include the edited version of the first component;

calculating a ratio between contributions of a first creator of the first prototype content and a second creator of the second prototype content to the consumption performance of the second prototype content based on the number of other prototype contents; and based on the calculated ratio between the contributions of the first and second creators, automatically distributing profits from sales of the second prototype content between accounts of the first and second creators, wherein the second prototype content includes a plurality of interactions, the determining the information regarding the consumption performance of the second prototype content comprises receiving manipulation logs for the second prototype content from a plurality of consumer terminals of the second prototype content, and determining reproduction performances of the second interactions by gathering the received manipulation logs, the acquiring the number of other prototype contents comprises acquiring a ratio of the reproduction performance of an interaction associated with the edited version of the first component to the reproduction performances of the interactions of the second prototype content, and the calculating the ratio between the contributions of the first and second creators comprises calculating the ratio between the contributions of the first and second creators based on the number of other prototype contents and the acquired ratio of the reproduction performance of the interaction associated with the edited version of the first component.

2. The method of claim 1, wherein the first component includes a layer set and interactions associated with objects included in the laser set, the edited version of the first component includes at least one new interaction associated with the first component, an edited layer set of the first component, and/or a new interaction associated with the edited layer set, and the at least one new interaction associated with the first component may be an interaction having a new trigger and/or a new response for an object included in the layer set of the first component.

3. The method of claim 1, wherein the second prototype content further includes edited versions of a second component of the first prototype content, and the acquired ratio of the reproduction performance of the interaction associated with the edited version of the first component is a ratio of the reproduction performance of either an interaction associated with one of the edited versions of the second component or the interaction associated with the edited version of the first component to the reproduction performances of the interactions of the second prototype content.

4. The method of claim 1, wherein the first prototype content includes a plurality of first interactions, the second prototype content includes a plurality of second interactions, the method further comprises comparing the first interactions and the second interactions, and the calculating the ratio between the contributions of the first and second creators, comprises calculating the ratio between the contributions of the first and second creators based on a result of the comparison of the first interactions and the second interactions.

5. The method of claim 1, further comprising:

comparing sales performances of the first and second prototype contents, wherein the calculating the ratio between the contributions of the first and second creators, comprises calculating the ratio between the contributions of the first and second creators based on a result of the comparison of the sales performances of the first and second prototype contents.

6. The method of claim 1, further comprising:

transmitting a first control signal to a prototype editing tool that the first creator logs on to and a second control signal to a prototype editing tool that the second creator logs on to, such that a communication channel is generated between the first and second creators, wherein the first control signal includes a control signal allowing information regarding the first component to be displayed on the communication.

7. The method of claim 6, wherein the transmitting the first and second control signals, comprises receiving user input on whether to upload the second prototype content to a prototype market from the second creator who has purchased the first prototype content, and if the received user input indicates that the second creator intends to upload the second prototype content to the prototype market, transmitting the first control signal to the prototype editing tool that the first creator logs on to and the second control signal to the prototype editing tool that the second creator logs on to.

8. The method of claim 7, wherein the receiving the user input, comprises determining differences between the first and second prototype contents and receiving the user input if the differences exceed a reference level.

9. A service server comprising:

a memory in which a computer program is loaded; and a processor executing the computer program, wherein the computer program includes an instruction of determining information regarding consumption performance of second prototype content, which includes an edited version of a first component of first prototype content, an instruction of acquiring a number of other prototype contents than the second prototype content that include the edited version of the first component, an instruction of calculating a ratio between contributions of a first creator of the first prototype content and a second creator of the second prototype content to the consumption performance of the second prototype content based on the number of other prototype contents, and an instruction of automatically distributing profits from sales of the second prototype content between accounts of the first and second creators, based on the calculated ratio between the contributions of the first and second creators, and wherein the second prototype content includes a plurality of interactions, the instruction of determining the information regarding the consumption performance of the second prototype content comprises: an instruction of receiving manipulation logs for the second prototype content from a plurality of consumer terminals of the second prototype content; and an instruction of determining reproduction performances of the second interactions by gathering the received manipulation logs, the instruction of acquiring the number of other prototype contents comprises an instruction of acquiring a ratio of the reproduction performance of an interaction associated with the edited version of the first component to the reproduction performances of the interactions of the second prototype content, and the instruction of calculating the ratio between the contributions of the first and second creators comprises an instruction of calculating the ratio between the contributions of the first and second creators based on the number of other prototype contents and the acquired ratio of the reproduction performance of the interaction associated with the edited version of the first component.

* * * * *